United States Patent Office 2,969,216
Patented Jan. 24, 1961

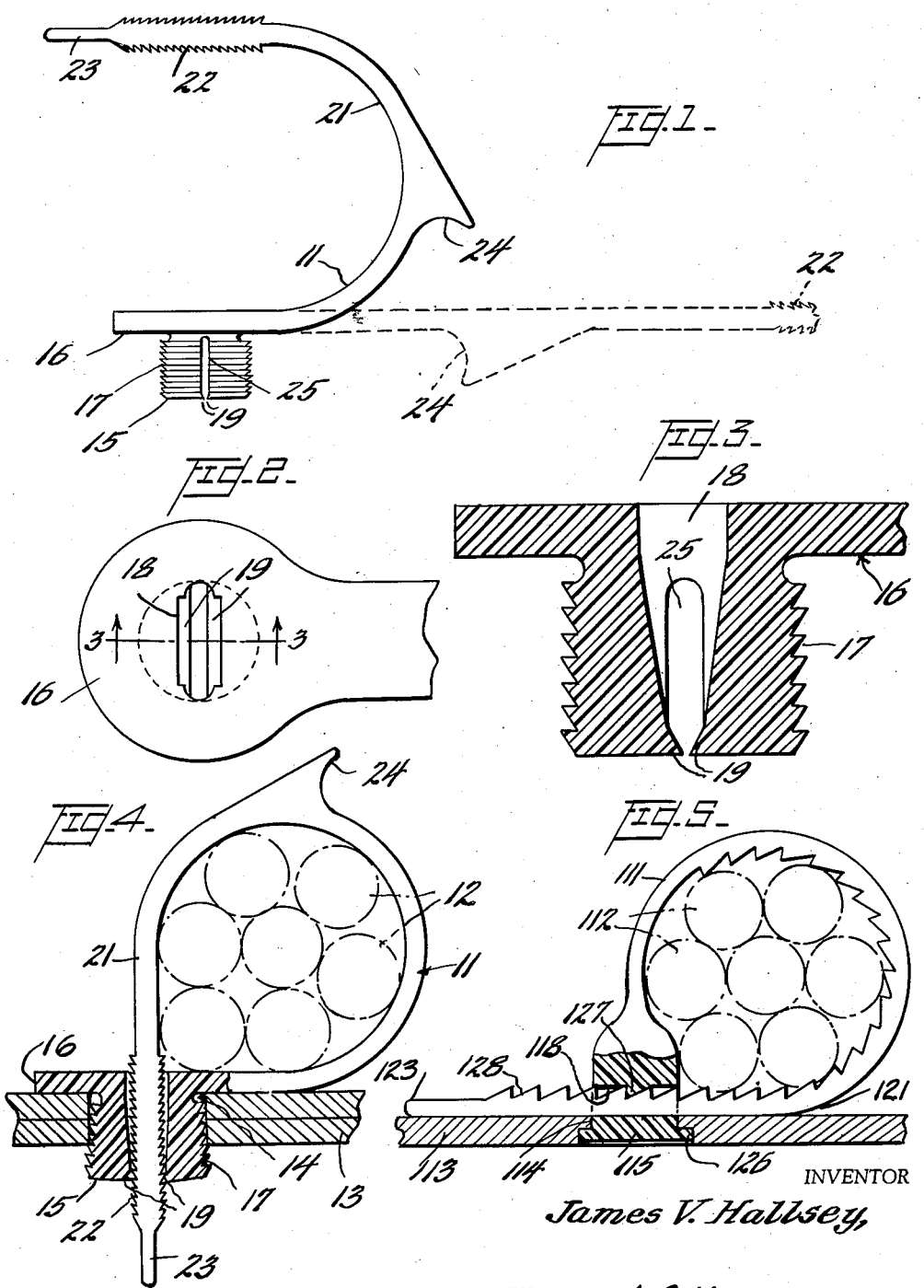

2,969,216

CLAMPS FOR SECURING AND SUPPORTING ARTICLES

James V. Hallsey, Graham, N.C., assignor to Western Electric Company, Incorporated, New York, N.Y., a corporation of New York Filed Apr. 25, 1958, Ser. No. 731,026

8 Claims. (Cl. 248—71)

This invention relates to clamps for securing and supporting articles and more particularly to self-locking clamps of unitary construction designed to support cables, wires, electrical components, and the like, from structural members.

In the installation of electrical wires, cables, conduits, electrical components, and the like, it is desirable that such articles be secured rigidly and supported at various points along their length to protect them from damage and also as a matter of safety and appearance. It is desirable that clamps used to secure and support these articles be relatively simple to install and capable of reliable service.

It is an object of this invention to provide new and improved clamps for securing and supporting articles.

Another object of this invention is to provide a new and improved self-locking clamp of unitary construction designed to support cables, wires, electrical components, and the like, from structural members.

A further object of this invention is to provide a self-locking clamp of the character described that provides a rigid, secure, clamping support and one that is installed easily and quickly.

A clamp embodying certain features of the invention may include a shank designed to be received within an aperture in a structural member from which an article is to be supported, the shank having a passageway extending therethrough and a strap attached at one end to the shank and having a free end portion extending from the shank. The free end portion of the strap is designed to be inserted into the shank passageway and frictionally retained therein to form a loop in which to support the article.

A complete understanding of the invention may be had from the following detailed description of specific embodiments thereof, when taken in conjunction with the appended drawings, in which:

Fig. 1 is a side elevation of a self-locking clamp in an uninstalled position;

Fig. 2 is a partial top plan view of the clamp shown in Fig. 1;

Fig. 3 is an enlarged fragmentary vertical section of the self-locking clamp taken along the line 3—3 of Fig. 2;

Fig. 4 is a side elevation of the clamp in an installed position, with parts thereof broken away for clarity; and Fig. 5 is a side elevation of a clamp representing an alternative embodiment of the inventor's clamp in an installed position, with parts thereof broken away for clarity.

Referring to Figs. 1 through 4, there is shown a self-locking clamp 11 supporting a group of insulated conductors 12—12 from a panel 13 which is provided with a circular aperture 14. The clamp 11, which is preferably formed of a flexible deformable, plastic material such as molded nylon or rubber or rubber-like materials having similar properties, has a cylindrical shank 15 with an enlarged head 16. The exterior surface of the shank 15 is provided with radially projecting ridges 17 designed to frictionally engage the walls of the aperture 14, as shown in Fig. 4. The cross-sectional configuration of the shank 15 is complementary to that of the aperture 14 and may be of a slightly smaller size to facilitate the insertion of the shank 15 into the aperture 14 a depth such that the enlarged head 16 on the shank 15 contacts the panel 13. The length of the shank 15 from the shoulder formed by the head 16 to its lower end is such that it projects through the aperture 14 and beyond the lower surface of the panel 13. As best shown in Fig. 3, a tapered passageway 18, substantially rectangular in cross section, extends longitudinally through the shank 15. The passageway 18 is further restricted at its narrow end by opposed laterally extending projections 19—19.

As shown in Fig. 1, an elongated strap 21 is formed integrally with and extends laterally from the head 16 of shank 15. The cross section of the strap 21 is similar to the cross section of the tapered passageway 18 in the shank 15 and is slightly less than that of the upper end of the passageway 18 and appreciably larger than the lower restricted end of the passageway 18. When the strap 21 is forced through the passageway 18, it frictionally engages the restrictive projections 19—19 which retain the strap 21 frictionally within the passageway 18, as shown in Fig. 3. Tooth-like serrations 22, formed on the opposite sides of the strap 21, cooperate with the restrictive projections 19—19 to lock the strap 21 positively within the passageway 18. In this fashion, a self-locking, adjustable loop is formed about the article 12 to be supported. The extremity of free end 23 of the strap 21 may be reduced in cross section and bevelled, or otherwise rounded, to permit the strap 21 to be guided easily into the passageway 18. A curved finger grip 24 may be formed on a portion of the strap 21 to enable the strap 21 to be more firmly held when forced through the restricted passageway 18.

When the strap 21 is forced through the passageway 18, the shank 15 is caused to expand, thus forcing the ridges 17 on the exterior surface of the shank 15 into frictional engagement with the inner walls of the aperture 14 to retain rigidly the shank 15 within the aperture 14. As shown in Fig. 1, the cylindrical shank 15 is bifurcated by providing a slot 25. The bifurcation enhances the deformability of the shank 15 thereby enabling the lower end portion thereof to be readily expanded in an installed position so that portions thereof overlap the lower surface of the panel 13. The shank 15 need not be bifurcated in instances where it is made of a material sufficiently flexible and deformable to enable the spreading of the lower end of the shank to be accomplished readily.

Assuming that it is desired to support a group of insulated conductors 12—12 from the panel 13, the shank 15 of the clamp 11 is first inserted into an aperture 14 in the panel. The free end 23 of the strap 21 is then passed around the conductors 12—12 and forced through the restricted passageway 18 until the strap 21 is drawn tightly around the wires. The tooth-like serrations 22 formed on opposite sides of the strap 21 cooperate with the projections 19—19 restricting the passageway 18 to lock the strap 21 within the passageway 18. In passing the strap 21 through the passageway 18 in the shank 15 in this manner, the shank 15 is caused to expand forcing the projecting ridges 17 on the exterior of the shank 15 into frictional engagement with the inner walls of the aperture 14, while that portion of the shank 15 which extends beyond the lower surface of the panel 13 is caused to overlap and grip the panel 13. This action retains the shank 15 rigidly within the aperture 14 in the panel 13 to securely support the wires.

*Alternative embodiment*

Referring now to Fig. 5, there is shown a self-locking clamp 111 forming an alternative embodiment of the invention in an installed position supporting a group of insulated conductors 112—112 from an apertured panel 113. The clamp is preferably formed of a flexible, deformable, plastic material such as molded nylon or rubber or rubber-like material. An annular flange 126 formed on an end of a cylindrical shank 115 rigidly retains the shank 115 within a counterbored circular aperture 114 in a mounting panel 113. A passageway 118 of substantially rectangular cross section extends transversely through the shank 115. The passageway 118 is restricted by a tooth-like projection 127 extending into the passageway 118. An elongated strap 121 having a free end 123 is integrally formed on and extends from the shank 115. The strap 121 has a cross section similar to that of the passageway 118. A plurality of tooth-like projections 128 are formed along a portion of and on one side of the strap 121 such that when the strap 121 is passed around conductors 112—112 and drawn through the passageway 118, the tooth-like projection 127 restricting the passageway 118 engages frictionally the similar tooth-like projections 128 formed along a length of the strap 121 to lock the strap 121 within the passageway 118. The bottom of the passageway 118 is substantially flush with the upper surface of the panel 113. In this manner an adjustable self-locking loop is formed which supports the conductors 112—112. Manifestly, the loop formed by the strap of the clamp may pass through an article to be supported rather than around the article, as is illustrated by way of example.

As shown in Fig. 5, the tooth-like projections 128 and the tooth-like projections 127 restricting the passageway 118 are so arranged that when the clamp is installed the tooth-like projections 128 are on the inside of the loop supporting the conductors 112—112. It is obvious that the clamp may be designed so that the tooth-like projections 128 will project from the exterior of the loop when the clamp is installed.

It will be understood that the above-described specific embodiments are merely exemplary of the principles of the invention. It is not intended to limit the inventions to the exact details of the construction set forth, and the invention embraces such changes, modifications, and equivalents of the parts and their formation and arrangement as come within the purview of the appended claims.

What is claimed is:

1. A one-piece, self-locking clamp for supporting an article from a structural member, which comprises a shank designed to be received within an aperture formed in a structural member, the shank having a passageway extending therethrough, restrictive means formed on the walls of said passageway, a flexible strap having a free end integrally formed on the shank and extending therefrom, the free end portion of the strap designed to be inserted into the passageway whereby the shank is expanded within the aperture, means on the free end portion of the strap cooperating with the restrictive means in the passageway to frictionally retain the free end of the strap within said passageway to form a loop in which to support the article.

2. A one-piece, self-locking clamp formed of a flexible material, which comprises a bifurcated, cylindrical shank having an enlarged head formed at one end thereof, the shank designed to be received within an aperture in a structural member from which an article is to be supported, said shank having a tapered passageway extending longitudinally therethrough, opposing lateral projections formed on the inner walls of the passageway at the narrow end of the passageway restricting said passageway, an elongated strap of a cross section similar to but somewhat larger in size than that of the restricted end of the passageway in the shank, said strap being formed integrally with the shank and extending laterally therefrom and having a finger grip formed on the strap intermediate the shank and a free end of the strap, the free end of the strap designed to be inserted through the passageway and to expand the shank within the aperture, and a plurality of tooth-like serrations formed on the strap for engaging the projections restricting the passageway to positively lock the strap within the passageway and thereby form a loop in which to support the article.

3. A one-piece, self-locking clamp formed of a flexible material which comprises a bifurcated, cylindrical shank with an enlarged head formed on an end, the shank designed to be received within an aperture in a panel from which an article is to be supported, the shank having a tapered passageway extending longitudinally therethrough, opposing lateral projections formed on the inner walls of the passageway at the narrow end of the passageway restricting said passageway, and an elongated strap integrally formed on the shank and extending laterally therefrom, said strap being of a larger cross section than that of the passageway whereby the shank will be expanded within the aperture upon insertion of a free end portion of the strap through said passageway, a plurality of tooth-like serrations formed on the strap for engaging the projections restricting the passageway to positively lock the strap within the passageway and thereby form an adjustable loop in which to support the article.

4. A one-piece, self-locking clamp for supporting an article from a structural member, which comprises a deformable, bifurcated, cylindrical shank designed to be received within a circular aperture formed in a structural member, a plurality of projecting ridges formed on the exterior of the shank, the shank having a tapered passageway extending therethrough, opposing lateral projections formed on the inner walls of the passageway at the narrow end of the passageway restricting said passageway, and an elongated strap of a cross section somewhat larger than that of the restricted end of the passageway in the shank, said strap being integrally formed with the shank and extending laterally therefrom, a free end of the strap designed to be inserted through the passageway to expand the shank and force the ridges on the shank into frictional engagement with the inner walls of the aperture, a plurality of tooth-like serrations formed on the strap for engaging the projections restricting the passageway to positively lock the strap within the passageway and thereby form an adjustable loop in which to support the article.

5. A one-piece, self-locking clamp formed of a flexible, deformable material which comprises a cylindrical shank designed to be inserted into an aperture in a panel from which an article is to be supported, an annular flange formed on an end of the shank for frictionally retaining the shank within the aperture, the shank having a substantially rectangular passageway extending transversely therethrough, a tooth-like projection formed on the inner walls of the passageway restricting said passageway, an elongated strap of a cross section similar to that of the restricted passageway integrally formed on the shank, a free end of the strap designed to be inserted through the passageway in the shank, and a plurality of tooth-like projections formed on the strap for engaging the tooth-like projection restricting the passageway to lock the strap within the passageway and thereby form an adjustable loop in which to support the article.

6. A one-piece clamp comprising a strap having an expandable head portion, said head portion having a passageway formed therethrough, a deformable restriction formed on said head portion and projecting into said passageway, said strap having locking means projecting therefrom which are greater in cross-sectional area than the cross-sectional area of the passageway adjacent the deformable restriction, whereby the strap may be passed through the passageway to expand said head and lock said strap against withdrawal by the engagement of the locking means with the deformable restriction.

7. A one-piece clamp adapted to be mounted within an aperture formed in a support which comprises a stud composed of expandable material and adapted to be mounted in said aperture, said stud having a passageway of predetermined cross-sectional area, a flexible strap running from said stud, and means formed on said strap for expanding said stud and locking said strap within said passageway upon the insertion of said strap into said passageway.

8. A one-piece article supporting device comprising a strap having an enlarged expandable head at one end with a passageway formed therethrough, a series of teeth formed on the strap, each tooth having one face inclined from the free end of the strap and the other face perpendicular to the strap, and a deformable locking projection extending into said passageway which is deformed to expand the head by the passage of the inclined faces of the teeth through the passageway and which engages a perpendicular face to preclude withdrawal of the strap from the passageway.

References Cited in the file of this patent

UNITED STATES PATENTS

| | | |
|---|---|---|
| 2,548,104 | Frison | Apr. 10, 1951 |
| 2,759,390 | Edwards | Aug. 21, 1956 |

FOREIGN PATENTS

| | | |
|---|---|---|
| 1,111,742 | France | Nov. 2, 1955 |
| 1,126,581 | France | July 30, 1956 |